US012776697B2

(12) United States Patent
Jong et al.

(10) Patent No.: US 12,776,697 B2
(45) Date of Patent: Oct. 27, 2026

(54) BALANCED MULTI-LEVEL POWER CONVERTER

(71) Applicant: Nanowatt Inc., Milpitas, CA (US)

(72) Inventors: Owen Jong, Milpitas, CA (US); Ya Liu, Milpitas, CA (US)

(73) Assignee: Nanowatt Inc., Milpitas, CA (US)

( * ) Notice: Subject to any disclaimer, the term of this patent is extended or adjusted under 35 U.S.C. 154(b) by 207 days.

(21) Appl. No.: 18/668,894

(22) Filed: May 20, 2024

(65) Prior Publication Data

US 2025/0357844 A1 Nov. 20, 2025

(51) Int. Cl.
*H02M 1/00* (2006.01)
*H02M 3/07* (2006.01)

(52) U.S. Cl.
CPC ........... *H02M 1/0095* (2021.05); *H02M 3/07* (2013.01)

(58) Field of Classification Search
CPC .... H02M 1/0095; H02M 3/07; H02M 7/4833; H02M 7/4837; H02M 3/158
See application file for complete search history.

(56) References Cited

U.S. PATENT DOCUMENTS 9,793,804 B2 * 10/2017 Zhang ................... H02M 3/158
10,075,080 B1 * 9/2018 Scoones .................. H02M 3/07
11,258,359 B2 * 2/2022 Baek ........................ H02M 3/07
11,588,391 B1 * 2/2023 Liu ...................... H02M 1/0054
11,855,531 B2 * 12/2023 Lim ......................... H02M 3/07
2016/0118886 A1 * 4/2016 Zhang .................... H02M 7/483 323/271
2018/0006559 A1 * 1/2018 Chen ................... H02M 7/4833
2018/0159346 A1 * 6/2018 Liu ............................ H02J 7/00
2019/0341845 A1 * 11/2019 Woo ......................... H02M 3/07
2021/0067033 A1 * 3/2021 Jing ....................... H02M 3/158
2021/0099088 A1 * 4/2021 Cannillo ............. H02M 3/1584
2022/0231601 A1 * 7/2022 Jong ................... H02M 1/0043

* cited by examiner

*Primary Examiner* — Kyle J Moody
(74) *Attorney, Agent, or Firm* — HG LAW LLP

(57) ABSTRACT

In accordance with some embodiments of the present disclosure, a multi-level power converter circuit includes a flying capacitor, a balancing capacitor to control a voltage across the flying capacitor, a plurality of converter switches, a control switch coupled between the flying capacitor and the balancing capacitor, and control circuitry to open and close the control switch based on states of at least two converter switches of the plurality of converter switches. In some embodiments, the multi-level power converter is a three-level buck converter, and the balancing capacitor maintains a voltage across the flying capacitor to be within a threshold range of half the input voltage of the buck converter. In some embodiments, a method for operating the multi-level power converter includes using control circuitry to operate the plurality of converter switches and the control switch to selectively couple the balancing capacitor to either side of the flying capacitor.

23 Claims, 7 Drawing Sheets

BALANCED MULTI-LEVEL POWER CONVERTER

TECHNICAL FIELD

The present disclosure is directed to balanced multi-level power converters.

BACKGROUND

Electric power may have a certain voltage level when it is received by a load (or a device servicing a load). The load may require the power to be at a different voltage level than that at which it is received.

SUMMARY

In accordance with the present disclosure, circuitry and control methods are provided for balanced multi-level power converters. The circuitry disclosed herein may improve the operational capabilities of systems including power converters, such as for electronic charging or other suitable applications.

In accordance with embodiments of the present disclosure, a multi-level power converter circuit includes a flying capacitor, a balancing capacitor to control a voltage across the flying capacitor, a plurality of converter switches, a control switch coupled between the flying capacitor and the balancing capacitor, and control circuitry to open and close the control switch based on states of at least two converter switches of the plurality of converter switches.

In some embodiments, in a first state of the circuit, the control switch is closed and the plurality of converter switches are controlled such that a first side of the flying capacitor is coupled to an input voltage and a second side of the flying capacitor is coupled to the balancing capacitor, and in a second state of the circuit, the control switch is closed and the plurality of converter switches are controlled such that the first side of the flying capacitor is coupled to the balancing capacitor and the second side of the flying capacitor is coupled to a reference voltage.

In some embodiments, the plurality of converter switches includes a first converter switch, a second converter switch, a third converter switch, and a fourth converter switch that are coupled in series in that order, in the first state of the circuit, the first converter switch and the third converter switch are closed and the second converter switch and the fourth converter switch are open, and in the second state of circuit, the second converter switch and the fourth converter switch are closed and the first converter switch and the third converter switch are open.

In some embodiments, the control circuitry is further to cause the control switch to close when one and only one of the first converter switch and the second converter switch are closed, and cause the control switch to open when neither of the first converter switch and the second converter switch are closed or when both of the first converter switch and the second converter switch are closed.

In some embodiments, a first side of the flying capacitor is coupled between the first converter switch and the second converter switch, and a second side of the flying capacitor is coupled between the third converter switch and the fourth converter switch.

In some embodiments, the control circuitry is further to cause the first converter switch and the fourth converter switch to be in opposite states and cause the second converter switch and the third converter switch to be in opposite states.

In some embodiments, the circuit also includes an inductor and an output capacitor, wherein the control circuitry is further to cause current to flow from the inductor to the output capacitor.

In some embodiments, the control circuitry is further to control the plurality of converter switches based at least in part on a switching period, the switching period including four intervals, wherein in a first of the four intervals, the first converter switch is closed and the second converter switch is opened, such that the voltage across the flying capacitor increases and the current through the inductor increases, in a second of the four intervals, the first converter switch is opened and the second converter switch is opened, such that the voltage across the flying capacitor is substantially constant and the current through the inductor decreases, in a third of the four intervals, the first converter switch is opened and the second converter switch is closed, such that the voltage across the flying capacitor decreases and the current through the inductor increases, and in a fourth of the four intervals, the first converter switch is opened and the second converter switch is opened, such that the voltage across the flying capacitor is substantially constant and the current through the inductor increases.

In some embodiments, the control circuitry is further to control the plurality of converter switches and the control switch such that the voltage across the flying capacitor is maintained to be within a threshold range (e.g., a threshold range around half of the input voltage or any other suitable reference voltage).

In some embodiments, the circuit includes a three-level buck converter.

In accordance with embodiments of the present disclosure, a multi-level power converter circuit includes a flying capacitor, a balancing capacitor, a plurality of converter switches, and a control switch coupled between the flying capacitor and the balancing capacitor, and a method for controlling the multi-level power converter circuit includes operating, using control circuitry, the plurality of converter switches such that an input power is received at an input voltage and an output power is provided at an output voltage, less than the input voltage; and operating, using the control circuitry, the control switch based on states of the plurality of converter switches, such that the balancing capacitor, by controlling a voltage across the flying capacitor, regulates the output voltage.

In some embodiments, the method also includes in a first state of the circuit, closing the control switch and controlling the plurality of converter switches such that a first side of the flying capacitor is coupled to the input voltage and a second side of the flying capacitor is coupled to the balancing capacitor, and in a second state of the circuit, closing the control switch and controlling the plurality of converter switches such that the first side of the flying capacitor is coupled to the balancing capacitor and the second side of the flying capacitor is coupled to a reference voltage.

In some embodiments, the plurality of converter switches includes a first converter switch, a second converter switch, a third converter switch, and a fourth converter switch that are coupled in series in that order, and the method also includes in the first state of the circuit, closing the first converter switch, closing the third converter switch, opening the second converter switch, and opening the fourth converter switch, and in the second state of circuit, closing the second converter switch, closing the fourth converter switch, opening the first converter switch, and opening and the third converter switch.

In some embodiments, the method also includes closing the control switch when one and only one of the first converter switch and the second converter switch are closed, and opening the control switch when neither of the first converter switch and the second converter switch are closed or when both of the first converter switch and the second converter switch are closed.

In some embodiments, the method also includes controlling the first converter switch such that a first side of the flying capacitor is coupled to or decoupled from the input voltage, and controlling the fourth converter switch such that a second side of the flying capacitor is coupled to or decoupled from the reference voltage.

In some embodiments, the method also includes causing the first converter switch and the fourth converter switch to be in opposite states, and causing the second converter switch and the third converter switch to be in opposite states.

In some embodiments, the circuit also includes an inductor and an output capacitor, and the method also includes operating the plurality of converter switches such that the output power flows from the inductor to the output capacitor.

In some embodiments, the plurality of converter switches includes a first converter switch, a second converter switch, a third converter switch, and a fourth converter switch that are coupled in series in that order, and the method also includes operating the plurality of converter switches based at least in part on a switching period, the switching period including four intervals, where in a first of the four intervals, closing the first converter switch and opening the second converter switch, such that the voltage across the flying capacitor increases and a current through the inductor increases, in a second of the four intervals, opening the first converter switch and opening the second converter switch, such that the voltage across the flying capacitor is substantially constant and the current through the inductor decreases, in a third of the four intervals, opening the first converter switch and closing the second converter switch, such that the voltage across the flying capacitor decreases and the current through the inductor increases, and in a fourth of the four intervals, opening the first converter switch and opening the second converter switch, such that the voltage across the flying capacitor is substantially constant and the current through the inductor increases.

In some embodiments, the method also includes operating the plurality of converter switches and the control switch such that the voltage across the flying capacitor is maintained to be within a threshold range (e.g., a threshold range around half of the input voltage or any other suitable reference voltage).

In accordance with some embodiments of the present disclosure, a three-level buck converter circuit includes a first converter switch, a second converter switch, a third converter switch, and a fourth converter switch that are coupled in series in that order, a flying capacitor with a first side coupled between the first converter switch and the second converter switch and a second side coupled between the third converter switch and the fourth converter switch, and a balancing capacitor coupled between the second converter switch and the third converter switch using a control switch, and a method for controlling the three-level buck converter circuit includes controlling, using control circuitry of the three-level buck converter circuit, the control switch such that the balancing capacitor, by controlling a voltage across the flying capacitor, regulates an output voltage of the three-level buck converter circuit.

In some embodiments, the method also includes, in a first state of the circuit, closing the control switch and controlling the first converter switch, the second converter switch, the third converter switch, and the fourth converter switch such that a first side of the flying capacitor is coupled to an input voltage and a second side of the flying capacitor is coupled to the balancing capacitor, and in a second state of the circuit, closing the control switch and controlling the first converter switch, the second converter switch, the third converter switch, and the fourth converter switch such that the first side of the flying capacitor is coupled to the balancing capacitor and the second side of the flying capacitor is coupled to a reference voltage.

In some embodiments, in the first state of the circuit, controlling the first converter switch, the second converter switch, the third converter switch, and the fourth converter switch includes closing the first converter switch, closing the third converter switch, opening the second converter switch, and opening the fourth converter switch, and in the second state of circuit, controlling the first converter switch, the second converter switch, the third converter switch, and the fourth converter switch includes closing the second converter switch, closing the fourth converter switch, opening the first converter switch, and opening the third converter switch.

In some embodiments, the method also includes opening the control switch when neither of the first converter switch and the second converter switch are closed or when both of the first converter switch and the second converter switch are closed.

In some embodiments, the three-level buck converter also includes an inductor and an output capacitor, and the method also includes controlling the first converter switch, the second converter switch, the third converter switch, and the fourth converter switch such that an output power comprising the output voltage flows from the inductor to the output capacitor.

In some embodiments, the method also includes controlling the first converter switch, the second converter switch, the third converter switch, and the fourth converter switch based at least in part on a switching period, the switching comprising four intervals, wherein in a first of the four intervals, closing the first converter switch and opening the second converter switch, such that the voltage across the flying capacitor increases and a current through the inductor increases, in a second of the four intervals, opening the first converter switch and opening the second converter switch, such that the voltage across the flying capacitor is substantially constant and the current through the inductor decreases, in a third of the four intervals, opening the first converter switch and closing the second converter switch, such that the voltage across the flying capacitor decreases and the current through the inductor increases, and in a fourth of the four intervals, opening the first converter switch and opening the second converter switch, such that the voltage across the flying capacitor is substantially constant and the current through the inductor increases.

In some embodiments, the method also includes controlling the control switch, the first converter switch, the second converter switch, the third converter switch, and the fourth converter switch such that the voltage across the flying capacitor is maintained to be within a threshold range (e.g., a threshold range around half of the input voltage or any other suitable reference voltage).

BRIEF DESCRIPTION OF THE DRAWINGS

The following description includes discussion of figures having illustrations given by way of example of implementations of embodiments of the disclosure. The drawings should be understood by way of example, and not by way of limitation. As used herein, references to one or more "embodiments" are to be understood as describing a particular feature, structure, and/or characteristic included in at least one implementation. Thus, phrases such as "in some embodiments" appearing herein describe at least one embodiment and implementation, and do not necessarily all refer to the same embodiment. However, they are also not necessarily mutually exclusive.

DETAILED DESCRIPTION

Figure 1:
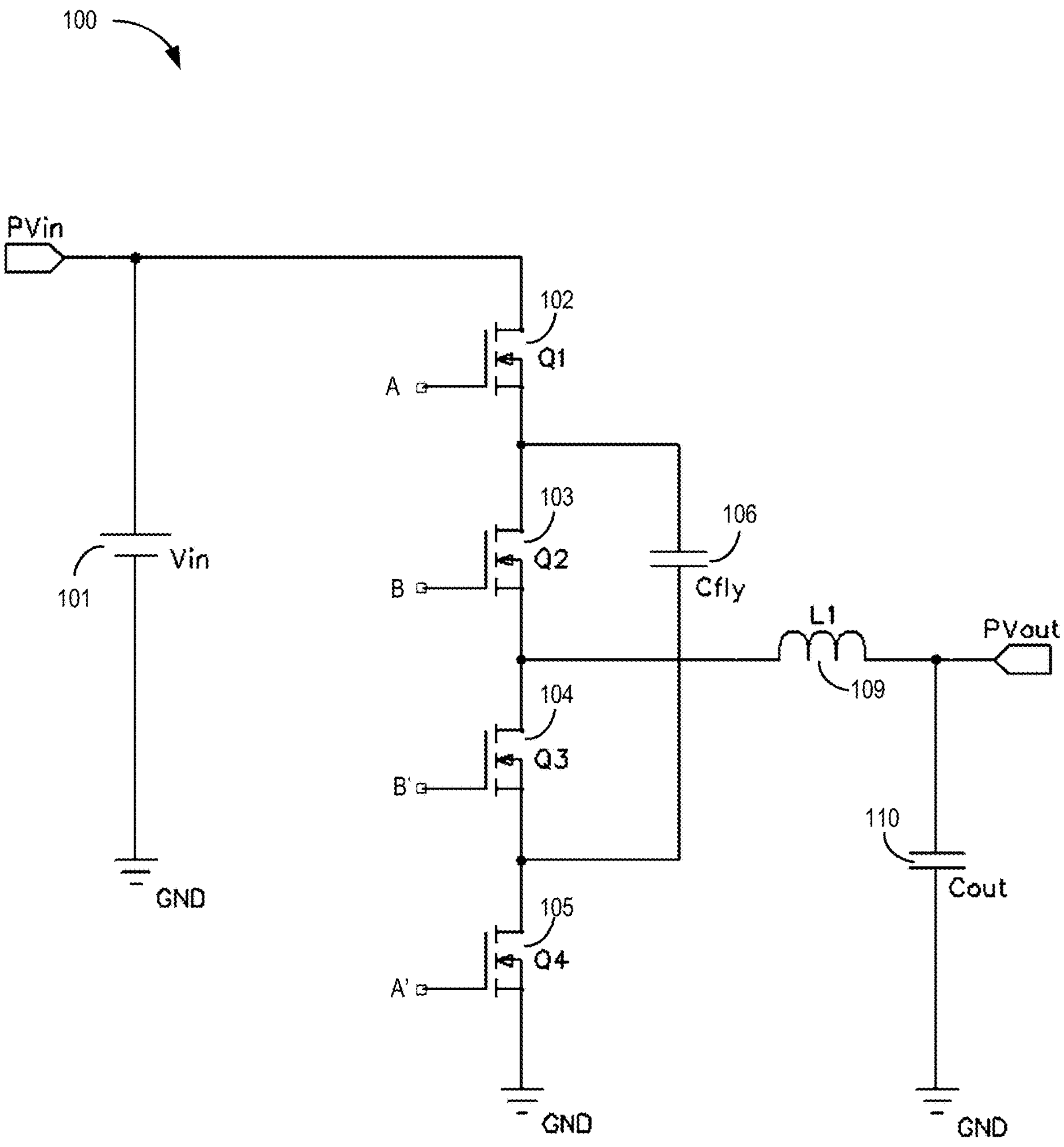
FIG. 1 shows an illustrative multi-level power converter circuit without a balancing capacitor in accordance with embodiments of the present disclosure.

Electronic systems commonly include power converter systems. Such power converter systems may increase, decrease, regulate, or otherwise control voltage and/or current levels in the electronic system. For example, a DC power converter may receive an input power at a first voltage level and may provide an output power at a second voltage level, different from the first. With appropriate power converter systems, various loads may be efficiently, quickly, and reliably powered by a single power supply.

A buck converter is a type of DC-DC power converter that receives input power at a certain voltage level and provides the input power to an output (e.g., a load, or any suitable device receiving the power) at a reduced (e.g., "stepped down") voltage level. In some embodiments, a buck converter is a multi-level buck converter (e.g., having two, three, or more internal voltage levels) in which particular nodes of the buck converter circuit (e.g., an input node, an output node, a node between switches of the converter, any other suitable circuit node, or any combination thereof) operate at a corresponding number of voltage levels. For example, particular nodes of a three-level buck converter may collectively operate at three voltage levels (e.g., an input voltage, half of the input voltage, and a reference voltage). As used herein, a reference voltage may refer to a ground voltage or any other suitable reference voltage. In some embodiments, various portions of a switching period determine when and how these particular nodes operate at the various voltage levels of the multi-level converter. It is noted that these various voltage levels may be any particular voltage levels.

In some embodiments, an illustrative three-level buck converter may include a flying capacitor. As used herein, a flying capacitor may refer to a capacitor that serves to maintain a specific voltage level of at least one circuit node (e.g., based on the nature of the capacitor to resist changes in voltage). For example, the three levels of the illustrative three-level buck converter may be an input voltage, half of the input voltage, and a reference voltage, and the flying capacitor may serve to maintain at least one node of the circuit at half of the input voltage.

In some embodiments, although a voltage across the flying capacitor may initially be set at a desired voltage level, this voltage across the capacitor may drift during operation of the corresponding circuit. Such drifting may worsen the performance (e.g., reduce an efficiency, reduce the precision of an output voltage, cause any other performance degradation, or any combination thereof) of the circuit. This drifting may occur because operation of the corresponding converter requires toggling of switches, and these switches or the toggling of these switches may be asymmetric. For example, asymmetric switches may refer to respective switches having different electrical properties (e.g., impedances, switching speeds, conductivities, settling times, or other relevant electrical properties). For example, asymmetric switch toggling may occur because control circuitry sending toggling signals may send these signals with stochastic delays, with fixed delays that vary for each respective switch, with time- dependent delays based on when the signal occurs within a switching period, with fluctuating or drifting voltages, or with any combination thereof.

To achieve and maintain desired performance of a power converter, it may be beneficial to regulate (e.g., maintain at or near a desired voltage level) a voltage across the flying capacitor. Corresponding control and/or circuit design schemes for regulating the flying capacitor may include one or more of the following features: a minimum number of additional components, a minimum amount of power consumption, compatibility with a maximum operating frequency of the converter, ease of integration with existing converter topologies, compatibility with a wide range of possible input and output voltages, imparting a minimum amount of stress (e.g., exposure to signals of high magnitude or rapidly changing transient properties) on other circuit components, and fast and precise responsiveness.

In accordance with embodiments of the present disclosure, a multi-level power converter is disclosed and may provide some or all of the abovementioned features. The multi-level power converter may include a flying capacitor that, based on operations executed by control circuitry, is selectively coupled to a balancing capacitor based on the state (e.g., opened or closed) of a balancing capacitor control switch (which may be simply referred to as the control switch), which the control circuitry causes to be opened or closed based on the states of one or more converter switches. In a first state of the multi-level power converter (e.g., charging the flying capacitor), the control switch is closed and the converter switches are controlled such that a first side of the flying capacitor is coupled to an input voltage of the circuit and a second side of the flying capacitor is coupled to a balancing capacitor. In a second state of the multi-level power converter (e.g., discharging the flying capacitor), the control switch is closed and the power switches are controlled such that the first side of the flying capacitor is coupled to the balancing capacitor and a second side of the flying capacitor is coupled to a reference voltage. The balancing capacitor is denoted as such because it balances (e.g., maintains at a desired voltage level (within a tolerable range of precision), e.g., regulates) a voltage across the flying capacitor. For example, the balancing capacitor may maintain a voltage of the flying capacitor within a threshold range (e.g., in one nonlimiting example, within 10%) of half of an input voltage to the multi-level power converter.

In some embodiments, the multi-level power converter may include an XOR gate or a functionally equivalent circuit (e.g., as part of control circuitry of the converter) to operate (e.g., control) the control switch based on states of one or more converter switches. For example, the converter switches may include a first converter switch, a second converter switch, a third converter switch, and a fourth converter switch that are coupled in series in that order, and the XOR gate may receive as inputs states of the first and second converter switches. Thus, when one and only one of the first and second switch is closed, the XOR gate may send a signal (e.g., an "ON" voltage corresponding to a digital "1") to the control switch, causing the control switch to close. In contrast, when both or neither of the first and second control switches are closed, the XOR gate may send a signal (e.g., an "OFF" voltage corresponding to a digital "0") to the control switch, causing the control switch to open. The balancing capacitor is coupled to the flying capacitor when the control switch is closed, and the states of one or more converter switches determine which side of the flying capacitor is coupled to the balancing capacitor. The balancing capacitor is thus decoupled from the flying capacitor when the first and second converter switches are both opened or are both closed, based on the control switch being opened under these converter switch states.

In some embodiments, the multi-level power converter also includes an inductor and an output capacitor, and the converter is controlled (e.g., using control circuitry to control the one or more converter switches and the flying capacitor control switch) based (at least in part) on a switching period. An illustrative switching period is described below with reference to FIG. 6.

In some embodiments, the muti-level power converter receives an input power from a power supply and provides an output power (e.g., having a lower voltage than the input power) to a load. In some embodiments, the load is an electronic device including a smartphone, tablet, or any other suitable load, particularly a load powered by a battery (e.g., where the battery may receive a current between 1-10 A at a voltage between 5-28 V). In some embodiments, the multi-level power converter provides power to a load according to the universal serial bus (USB) power delivery (PD) specification.

FIG. 1 shows an illustrative depiction of a multi-level buck converter 100 with a flying capacitor 106. In some embodiments, a control scheme (e.g., for controlling converter switches 102, 103, 104, and 105, e.g., based on states A, A', B, and B', as shown and as additionally described below) is implemented to try and maintain a voltage across the flying capacitor 106 within a target range. However, as shown in connection with FIG. 2, this voltage across the flying capacitor 106 may end up drifting during operation of the power converter, which is detrimental to the power conversion capabilities of the multi-level buck converter 100.

Figure 2:
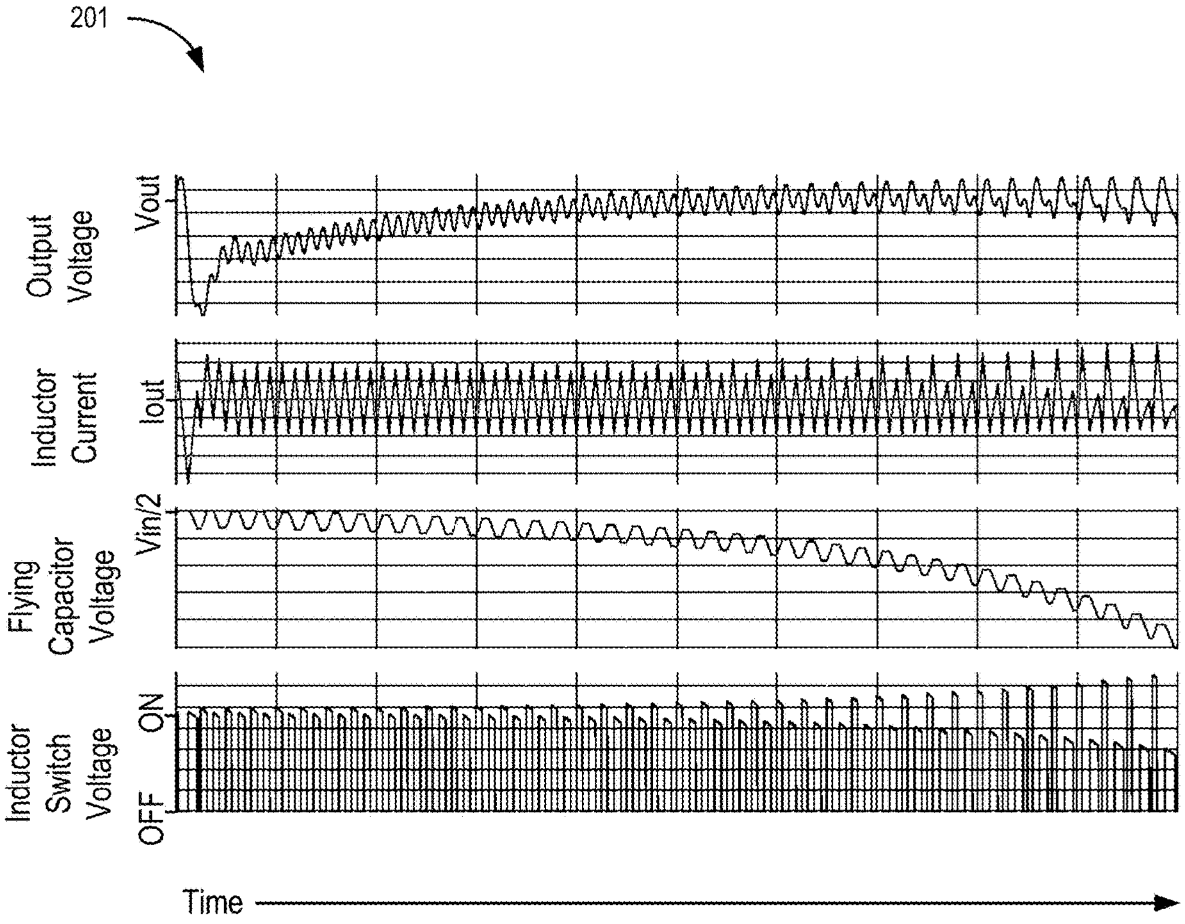
FIG. 2 shows illustrative performance characteristics of a multi-level power converter circuit without a balancing capacitor in accordance with embodiments of the present disclosure.

FIG. 2 shows illustrative signals of a multi-level power converter (e.g., of the multi- level buck converter 100). Plot 201 of FIG. 2 shows signals of a multi-level power converter (e.g., of the multi-level buck converter 100) across many switching periods. As shown in the top panel of plot 201, after an initial startup period, the output voltage oscillates around a mean value that corresponds to a desired output voltage (Vout). However, as shown in the right-most switching periods of the output voltage, the oscillations become increasingly distorted (e.g., having higher order harmonics and/or deviating from a pure sinusoid) and show increasingly larger peak-to-peak deviations from the desired output voltage. These negative effects occur due to the drifting voltage of the flying capacitor (e.g., flying capacitor 106), as is further explained below. Similarly, as shown in the second-from-the-top panel of plot 201, the output current initially oscillates around a mean value that corresponds to the desired output current (Iout), but these oscillations become increasingly distorted and show increasingly larger peak-to-peak deviations from the desired output voltage. Again, these negative effects occur due to the drifting voltage of the flying capacitor.

As shown in the second-from-the-bottom panel of plot 201, the flying capacitor voltage initially oscillates around a desired voltage level (Vin/2). However, with an increasing number of switching periods, a moving average (e.g., considering a single switching period, or a single peak-to-peak period) of the flying capacitor voltage begins to decrease, such that at the end of plot 201, the flying capacitor voltage is at a lower limit of the second-from-the-bottom panel's vertical axis. The other panels of plot 201 show how the output voltage, inductor current, and inductor switch voltage signals all deviate from the consistent trends shown in earlier switching periods (e.g., before the flying capacitor voltage has significantly dropped). These negative effects are caused by the reduced flying capacitor voltage.

It is noted that such drifting or reduction of a flying capacitor voltage is commonly encountered in operation of some multi-level power converters (e.g., multi-level buck converter 100). Overcoming this drifting in the multi-level buck converter 100 may require the implementation of difficult-to-maintain feedback loops and/or control schemes for operating the converter switches 102, 103, 104, and 105. Moreover, implementation of such feedback loops and/or control schemes may be unreliable, may reduce the efficiency of the power conversion, or may have other undesirable consequences.

Therefore, as mentioned above, certain multi-level power converter circuits (e.g., circuits that are distinct from the multi-level buck converter 100) may implement various techniques, devices, or a combination thereof to regulate the voltage of a flying capacitor. In accordance with embodiments of the present disclosure, such multi-level power converter circuits and corresponding control methods (e.g., as executed by respective control circuitry of the multi-level power converter circuits) are provided herein.

Figure 3:
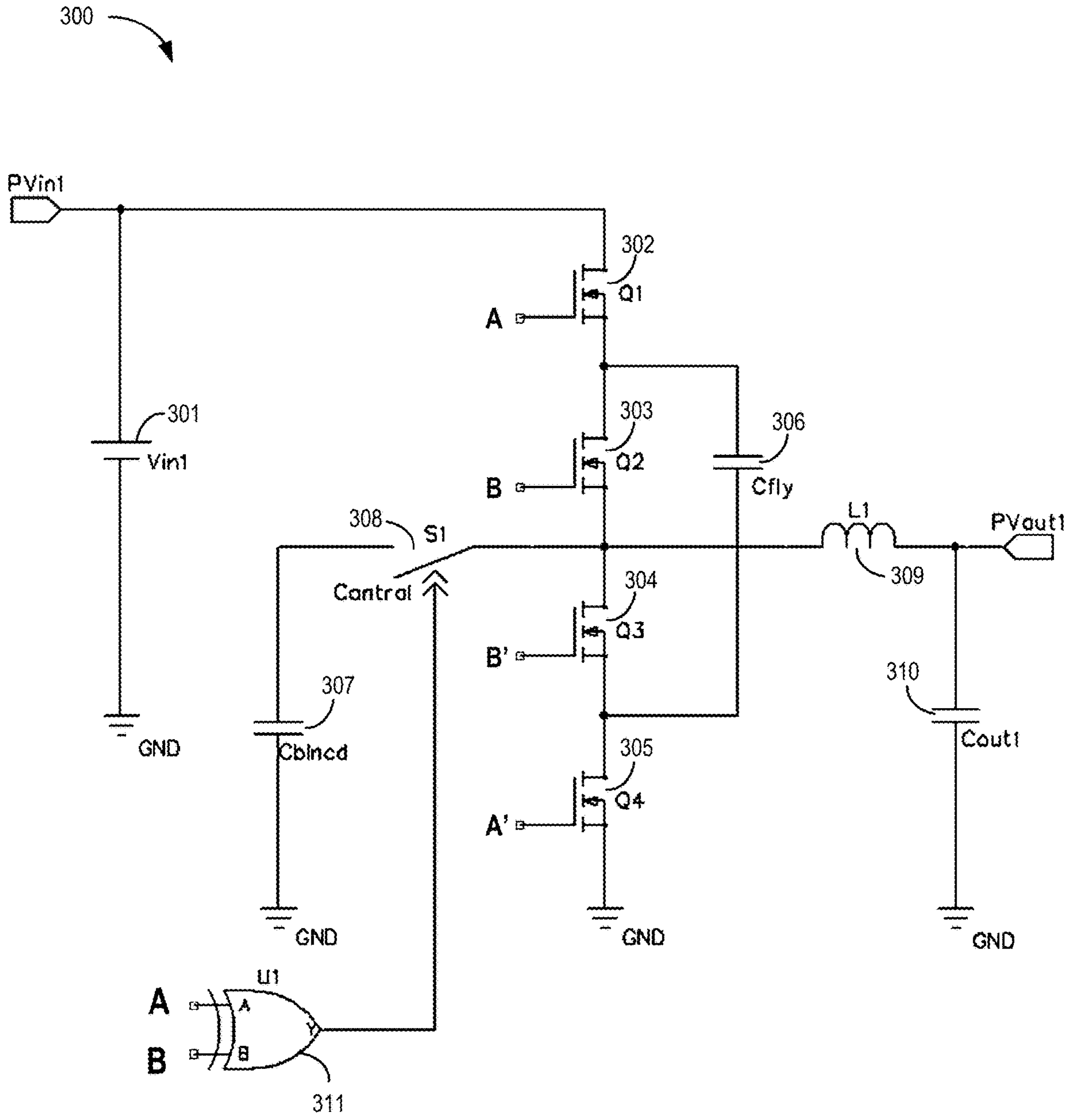
FIG. 3 shows an illustrative multi-level power converter circuit in accordance with embodiments of the present disclosure.

FIG. 3 shows a multi-level power converter circuit 300 for balancing the voltage across a flying capacitor, in accordance with some embodiments of the present disclosure. The power converter circuit 300 receives input power 301 at an input voltage, and this input power is coupled to or decoupled from flying capacitor 306 and the rest of the circuit based on a state (e.g., as represented by A) of first converter switch 302. Second converter switch 303 (e.g., with state B), third converter switch 304 (e.g., with state B'), and fourth converter switch 305 (e.g., with state A') are coupled in series, in that order, with first converter switch 302. In other words, if all four converter switches are closed, then an input power may flow from first converter switch 302, to second converter switch 303, to third converter switch 304, to fourth converter switch 305, to ground. It is noted that converter switches 302-305 are shown in FIG. 3 as n-channel MOSFET (e.g., NFET) devices, but any other suitable type of switch (e.g., including but not limited to p-channel MOSFET devices) may be used, with corresponding states and logic schemes, in place of NFETs without departing from the scope of the present disclosure.

As used herein, the state of a converter switch (e.g., A, A', B, or B') may refer to whether the switch is closed (e.g., ON, voltage-high, or binary '1') or open (e.g., OFF, voltage-low, or binary '0'). As used herein, designations A and A' (or B and B') may refer to a converter switch control scheme in which the base switch (e.g., A or B) is controlled to drive power flow as desired through the multi-level power converter circuit 300 and/or the inductor 309, and the complementary switch (e.g., A' or B') is controlled to have a state opposite the base switch. For example, when first converter switch 302 (A) is open, fourth converter switch 305 (A') is closed, and vice versa; the same holds true for second converter switch 303 (B) and third converter switch 304 (B'). In other words, control circuitry may cause A and A' (and B and B') to be in opposing states.

As shown, a first side of flying capacitor 306 is coupled between first converter switch 302 and second converter switch 303, and a second side of flying capacitor 306 is coupled between third converter switch 304 and fourth converter switch 305. Thus, based on the states of these converter switches, the first side of flying capacitor 306 may be coupled to the input power, to a first floating node, or to inductor 309, and the second side of flying capacitor 306 may be coupled to a reference voltage (e.g., ground, as shown), to a second floating node, or to inductor 309. Moreover, based on the states of these four converter switches and the control switch 308, either side of the flying capacitor 306 may be coupled to the balancing capacitor 307. Through this configuration, balancing capacitor 307 may regulate a voltage on flying capacitor 306, as described above and as additionally described below.

In some embodiments, control switch 308 is controlled by an XOR gate 311 (although other functionally equivalent circuitry may also be used). States A and B may be provided as inputs to the XOR gate 311, such that control switch 308 is closed when one and only one of first converter switch 302 and second converter switch 303 are closed, and control switch 308 is opened when neither or both of first converter switch 302 and second converter switch 303 are closed. Thus, balancing capacitor 307 may be coupled to multi-level power converter circuit 300 when it is desirable to regulate a voltage on flying capacitor 306, and balancing capacitor 307 may otherwise be decoupled from multi-level power converter circuit 300 (e.g., to avoid influencing power flow through inductor 309).

Multi-level power converter circuit 300 also includes inductor 309 and output capacitor 310. Inductor 309 may reduce the input voltage associated with input power 301, such that the multi-level power converter circuit 300 may provide an output voltage that is less than the input voltage (e.g., in a three-level buck converter configuration, e.g., for USB-PD applications). Output capacitor 310 may smooth an output current provided to a load (which may be connected to the node labeled "PVout1") and may also protect the load by smoothing out ripple voltages (e.g., as may be caused by the switching of the converter switches).

Figure 4:
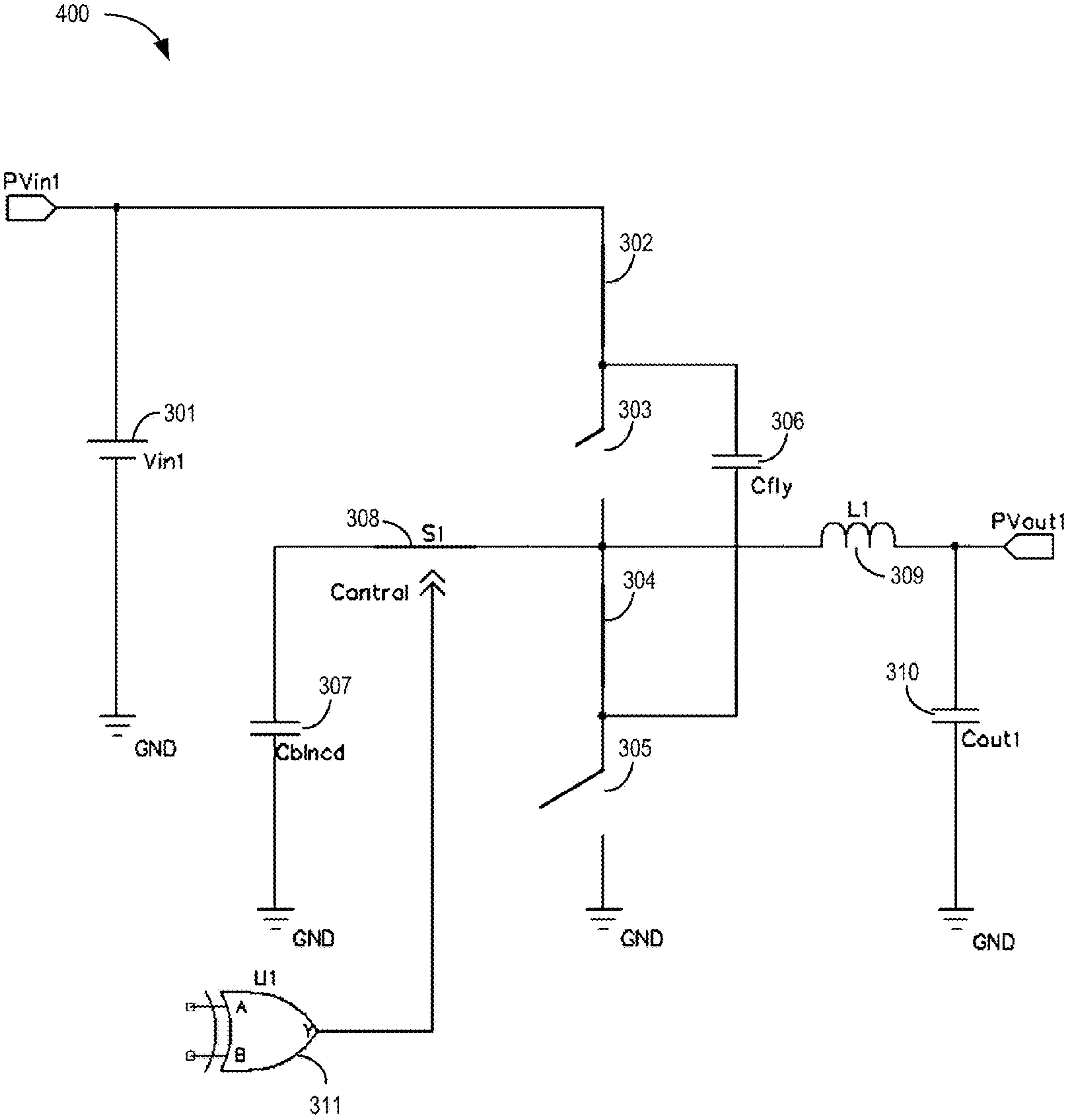
FIG. 4 shows an illustrative first state of a multi-level power converter circuit in accordance with embodiments of the present disclosure.
Figure 6:
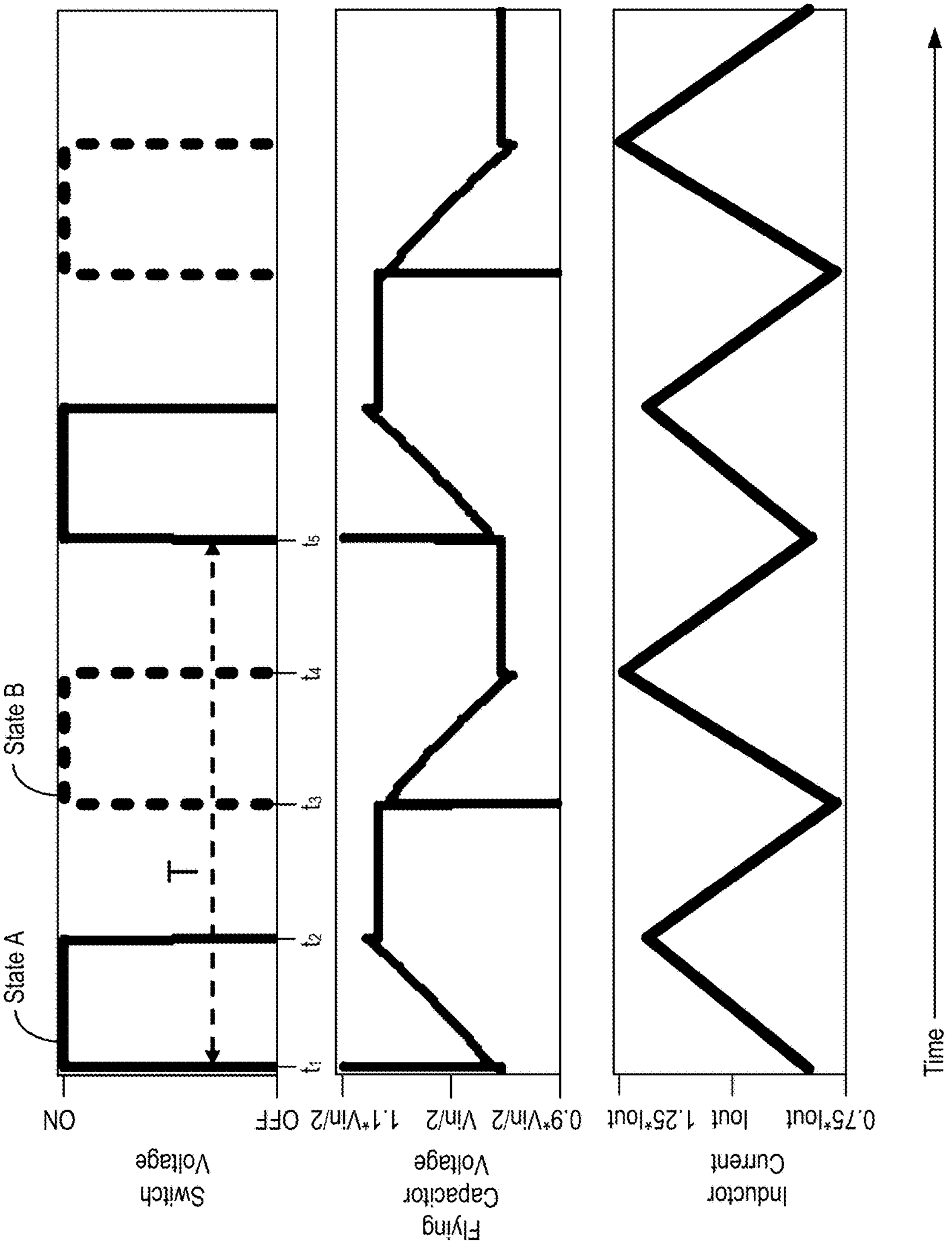
FIG. 6 shows waveforms generated during operation of an illustrative multi-level power converter circuit in accordance with embodiments of the present disclosure.

FIG. 4 shows a first state 400 of the multi-level power converter circuit 300. In some embodiments, the first state 400 of the multi-level power converter circuit 300 corresponds to the first interval of a switching period (e.g., as described below at least in connection with FIG. 6), and the circuit is operated based at least in part on the switching period. In the first state 400 of the multi-level power converter circuit 300, the first converter switch 302 is closed (e.g., state A is a '1') and the second converter switch 303 is opened (e.g., state B is a '0'); thus, the third converter switch 304 is closed (e.g., state B'is a '1') and the fourth converter switch 305 is opened (e.g., state A'is a '0'). Accordingly, the XOR gate 311 outputs a logical '1' and control switch 308 is closed. Thus, the first side of flying capacitor 306 is coupled to the input power 301, and the second side of flying capacitor 306 is coupled to balancing capacitor 307. In this first state 400 of the multi-level power converter circuit 300, the flying capacitor 306 voltage increases and the inductor 309 current increases (e.g., as shown in FIG. 6).

Figure 5:
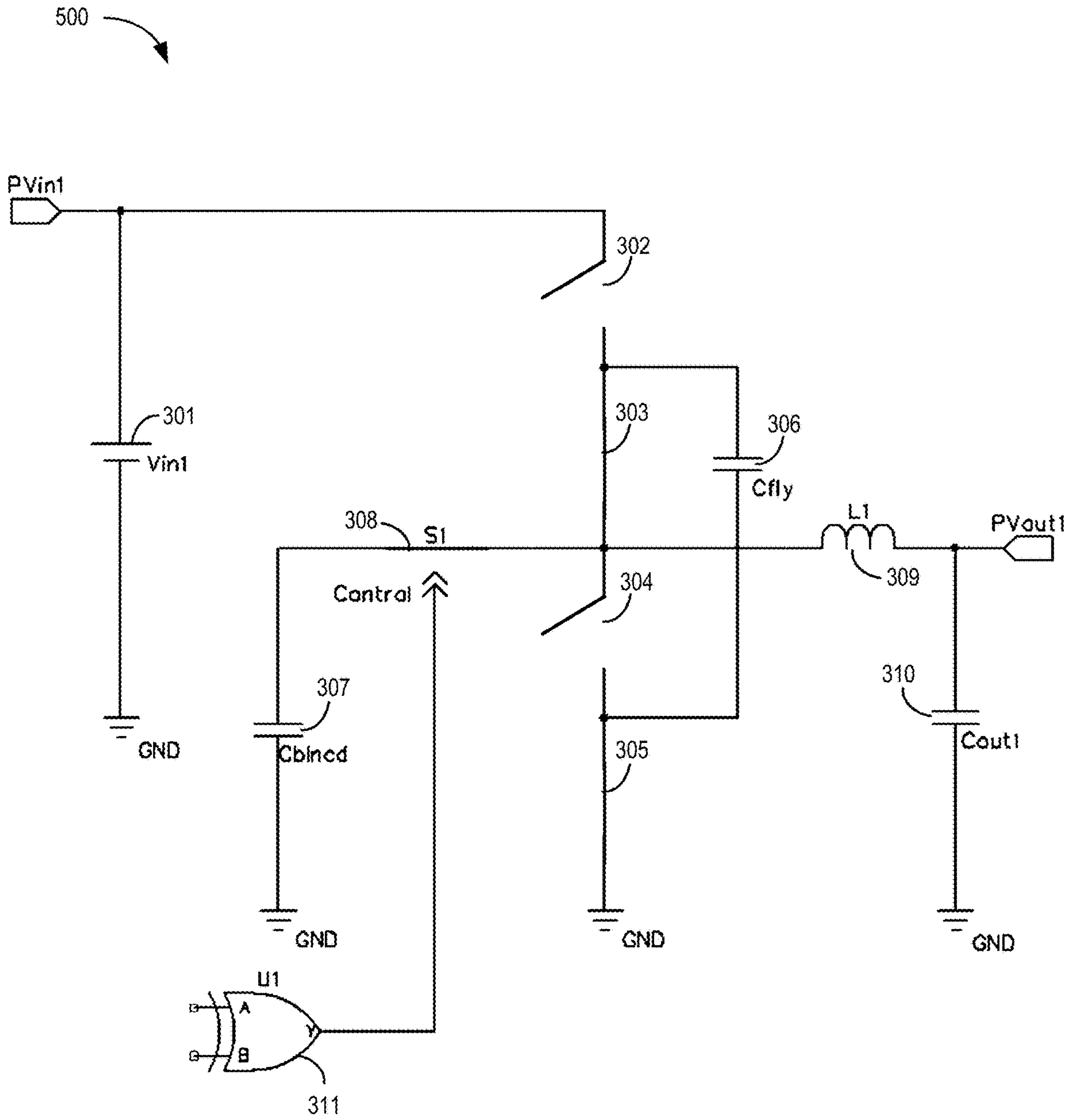
FIG. 5 shows an illustrative second state of a multi-level power converter circuit in accordance with embodiments of the present disclosure.

FIG. 5 shows a second state 500 of the multi-level power converter circuit 300. In some embodiments, the second state 500 of the multi-level power converter circuit 300 corresponds to the third interval of a switching period (e.g., as described below at least in connection with FIG. 6). In the second state 500 of the multi-level power converter circuit 300, the first converter switch 302 is opened (e.g., state A is a '0') and the second converter switch 303 is closed (e.g., state B is a '1'); thus, the third converter switch is opened 304 (e.g., state B' is a '0') and the fourth converter switch 305 is closed (e.g., state A'is a '1'). Accordingly, the XOR gate 311 outputs a logical '1' and control switch 308 is closed. Thus, the first side of flying capacitor 306 is coupled to the balancing capacitor 307 and the second side of flying capacitor 306 is coupled to a reference voltage. In this second state 500 of the multi-level power converter circuit 300, the flying capacitor 306 voltage decreases and the inductor 309 current increases (e.g., as shown in FIG. 6).

Figure 7:
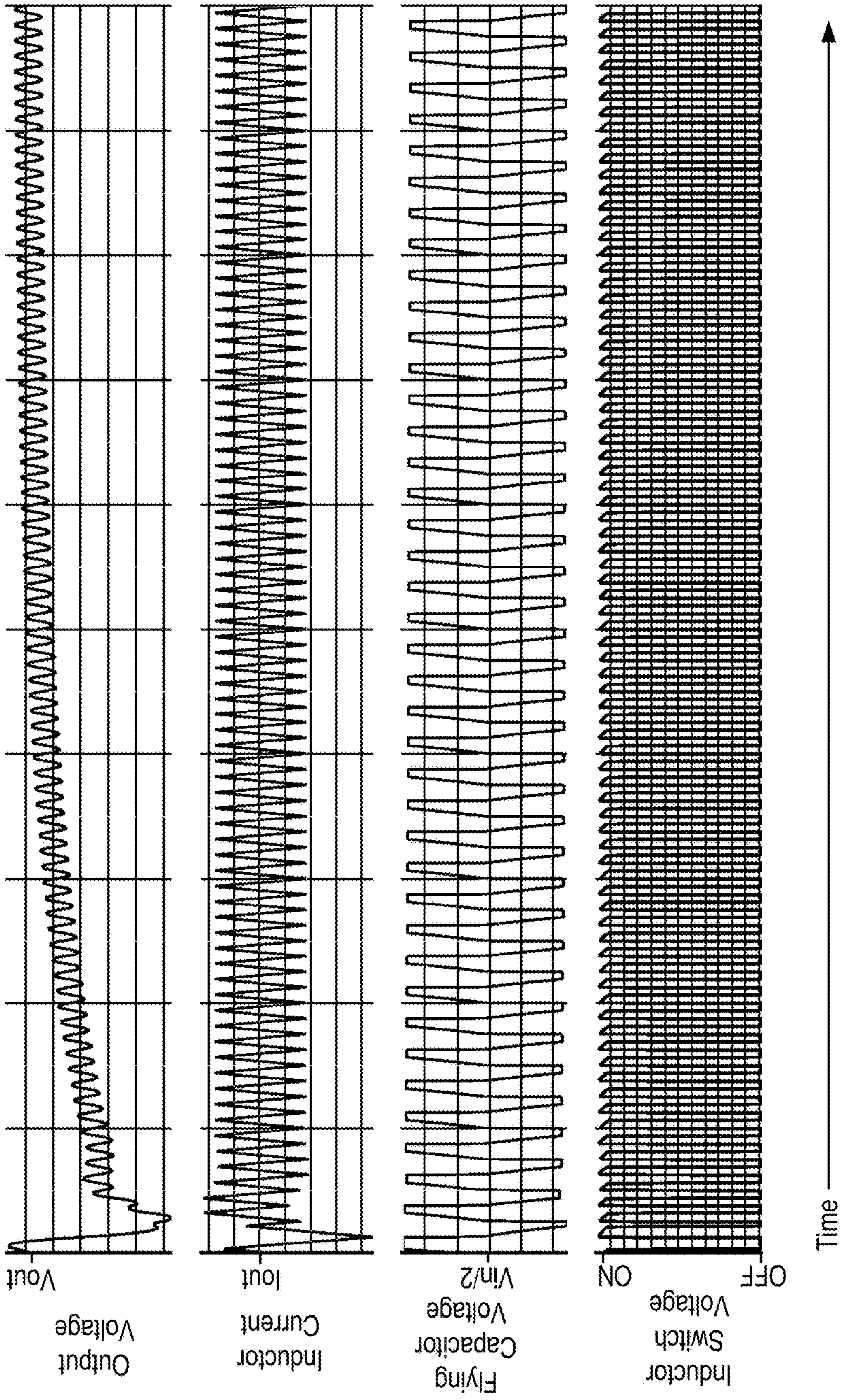
FIG. 7 shows waveforms generated over multiple switching periods of operation of an illustrative multi-level power converter circuit in accordance with embodiments of the present disclosure.

Based on the flying capacitor 306 voltage increasing in the first state 400 of the multi-level power converter circuit 300 and decreasing in the second state 500 of the multi-level power converter circuit 300, the voltage across the flying capacitor 306 may be regulated across many switching periods of operation (e.g., as shown in FIG. 7). For example, regulating the voltage across the flying capacitor 306 may result in maintaining this voltage within a threshold range (e.g., +/−1%, +/−10%, or any other suitable threshold range) of a target value (e.g., half of the voltage associated with input power 301).

It is noted that in FIGS. 4 and 5, the first converter switch 302, second converter switch 303, third converter switch 304, and fourth converter switch 305 are depicted as closed (e.g., a short-circuit connection) or open (e.g., an open-circuit connection) switches, based on the given states of these switches. These depictions are illustrative of 'ON' and 'OFF' states of digital switches, which may be implemented as n-type field effect transistors (e.g., as shown in FIG. 3), p-type field effect transistors, any other suitable transistor, or any other suitable digital switch. In some embodiments, the states of the switches are determined based on a voltage signal (e.g., as shown in the top panel of FIG. 6) that may be applied (e.g., by control circuitry) to a gate or other terminal of the digital switch.

FIG. 6 shows illustrative waveforms generated during multiple switching periods when operating the multi-level power converter circuit 300, in accordance with some embodiments of the present disclosure. As annotated in the top panel of FIG. 6, a length of time "T" may correspond to a single switching period or an entire switching period. In some embodiments, the single or entire switching period includes four intervals. For example, the four intervals may be (i) the time from $t_1$ to $t_2$, (ii) the time from $t_2$ to $t_3$, (iii) the time from $t_3$ to $t_4$, and (iv) the time from $t_4$ to $t_5$. In some embodiments, successive switching periods effectively repeat the four aforementioned intervals. With additional reference to the top panel of FIG. 6, the switch voltages (e.g., ON or '1', and OFF or '0') corresponding to converter switch states A and B are respectively shown by the solid and dashed lines (which are annotated for additional clarity). In the following paragraphs, four illustrative switching period intervals (e.g., the four intervals forming a "T" interval) are described.

In the first interval (e.g., corresponding to the first state 400 of the multi-level power converter circuit 300) of the switching period, the first converter switch 302 is closed (e.g., based on the "State A" switch voltage signal being ON) and the second converter switch 303 is opened (e.g., based on the "State B" switch voltage signal being OFF), as shown in the top panel of FIG. 6. Accordingly, the control switch 308 is closed (e.g., based on being driven by the XOR gate 311, which receives inputs from the switch voltage signals for states A and B), and the fourth converter switch 305 and the third converter switch 304 are respectively opened and closed (e.g., based on respectively operating in states A' and B'). Based on this configuration, input power flows through the first converter switch 302 to charge the flying capacitor 306, such that the voltage across the flying capacitor increases, as shown in the middle panel of FIG. 6. The second side of the flying capacitor 306 is coupled to the balancing capacitor 307 (e.g., based on the control switch 308 being closed) and is coupled to an input of the inductor 309, such that the balancing capacitor 307 (e.g., based on resisting a change in voltage) regulates a voltage at the second side of the flying capacitor 306 and at the input of the inductor 309. Accordingly, a current through the inductor 309 increases, as shown in the bottom panel of FIG. 6.

In a second interval (which typically follows the first interval) of the switching period, the first converter switch 302 is opened and the second converter switch 303 is opened, as shown in the top panel of FIG. 6. Accordingly, the control switch 308 is opened, and the third converter switch 304 and the fourth converter switch 305 are closed. Based on this configuration, the input power 301 is temporarily disconnected from the flying capacitor 306. Moreover, a voltage of the flying capacitor 306 is substantially constant (as shown in the middle panel of FIG. 6) because the first side of the flying capacitor 306 is coupled to a floating node (e.g., there is no path for current to flow into or out of the first side of the flying capacitor). The input of the inductor 309 (and the second side of the flying capacitor 306) are coupled to a reference voltage because the third converter switch 304 and the fourth converter switch 305 are closed. Accordingly, a current through the inductor decreases, as shown in the bottom panel of FIG. 6.

In a third interval (e.g., corresponding to the second state 500 of the multi-level power converter circuit 300) (which typically follows the second interval) of the switching period, the first converter switch 302 is opened and the second converter switch 303 is closed, as shown in the top panel of FIG. 6. Accordingly, the control switch 308 is closed, and the third converter switch 304 and fourth converter switch 305 are respectively opened and closed. Based on this configuration, the input power 301 remains temporarily disconnected from the flying capacitor 306. Moreover, a first side of the flying capacitor 306 is coupled to the balancing capacitor 307 and an input of the inductor 309, such that stored energy flows from the flying capacitor 306 to the balancing capacitor 307. Accordingly, the voltage across the flying capacitor 306 decreases, as shown in the middle panel of FIG. 6, and the current through the inductor 309 increases, as shown in the bottom panel of FIG. 6. The second side of the flying capacitor 306 is coupled to a reference voltage, which creates a closed path through which the flying capacitor 306 may discharge onto the balancing capacitor 307.

In a fourth interval (which typically follows the third interval) of the switching period, the first converter switch 302 is opened and the second converter switch 303 is opened, as shown in the top panel of FIG. 6. Accordingly, the control switch 308 is opened, and the third converter switch 304 and the fourth converter switch 305 are closed. Based on this configuration, the input power 301 remains temporarily disconnected from the flying capacitor 306. Moreover, a voltage of the flying capacitor 306 is substantially constant because the first side of the flying capacitor 306 is coupled to a floating node (e.g., there is no path for current to flow into or out of the first side of the flying capacitor), as shown in the middle panel of FIG. 6. The input of the inductor 309 (and the second side of the flying capacitor 306) are coupled to a reference voltage. Accordingly, a current through the inductor 309 decreases, as shown in the bottom panel of FIG. 6.

For example, in some illustrative and nonlimiting embodiments, each switching period interval may be 1 or 2 microseconds, or faster, and each switching period length "T" may be 4 or 8 microseconds, or faster. Thus, the multi-level power converter circuit 300 may operate with a switching period frequency of at least 125 kHz or 250 kHz, or faster.

In some embodiments, the multi-level power converter circuit 300 may be operated by control circuitry according to a peak current mode control scheme. The multi-level power converter circuit 300 may include the control circuitry (including XOR gate 311, as well as additional control circuitry), and this control circuitry may monitor an output of the circuit (e.g., an output voltage, current, power, or any combination thereof) that is provided to a load. The control circuitry may correspondingly control states of the converter switches 302-305 and the control switch 308 based on the monitored output of the multi-level power converter circuit 300.

FIG. 7 shows illustrative waveforms generated during many switching periods of operation of the multi-level power converter circuit 300. As shown in the top panel of FIG. 7, after an initial startup period, the output voltage is stably provided and oscillates around a target output voltage level (where the peak-to-peak amplitude of the oscillation is within a tolerable range of this target output level). Comparing the top two panels of FIG. 7, the multi-level power converter circuit 300 may create a phase shift (e.g., of approximately 180°) between the output voltage and the inductor current (as shown in the second-from-the-top panel of FIG. 7), such that an output power provided by the multi-level power converter circuit 300 is substantially constant. Consistent with the discussion above, a voltage across the flying capacitor 306, as shown in the second-from-the-bottom panel of FIG. 7, is maintained and regulated around half of the input voltage to the multi-level power converter circuit 300. This regulation is achieved at least in part based on the operation of the control switch 308, which is controlled to be in closed (e.g., ON) and opened (e.g., OFF) states as shown in the bottom panel of FIG. 7.

In some embodiments, one or more methods of operating the multi-level power converter circuit 300 include using control circuitry (which may be external to the multi-level power converter circuit 300, included within the multi-level power converter circuit 300, or a combination thereof) to control the converter switches 302-305 and/or the control switch 308. The control circuitry may control these switches to execute the operations and outcomes as discussed above (e.g., at least in connection with: FIGS. 3-7, the first state 400 and the second state 500 of the multi-level power converter circuit 300, and the four intervals of the switching period as described at least in connection with FIGS. 6 and 7).

The terms "coupled to", "coupled with" and variations thereof may indicate that two or more circuit elements are electrically connected to each other (e.g., by a wire, a common node, or any other suitable connection). Devices that are coupled to or with each other need not be directly coupled to or with each other. For example, devices that are coupled to or with each other may be coupled directly or indirectly (e.g., through one or more intermediary elements).

The terms "input" and "output" may be used to characterize portions of a circuit. It will be understood that these characterizations are merely for the purpose of illustrating some embodiments of the present disclosure. An input may serve as an output, and vice versa. Either one of an input or an output may be coupled to additional circuitry that is not shown, including a source or a load, without changing the function of the circuit as shown or the related teachings.

The term "phase" may be used to characterize a temporal offset, including a phase shift, as may be associated with a frequency, switching period, or other repetitive operation.

The term "path" may be used to characterize portions of a circuit, including a sequence of coupled elements. In some embodiments, a path includes at least a wire through which current may conduct. In some embodiments, a path includes one or more devices (e.g., capacitors, switches, inductors, resistors, power sources, loads, any other suitable device, or any combination thereof).

The term "node" may be used to characterize a connected portion of a circuit (e.g., a wire) that shares a single voltage at a given moment of operation.

The foregoing description of various embodiments has been presented for the purposes of illustration and description. It is not intended to be exhaustive or to be limited to the precise forms disclosed. Many modifications and variations are possible in light of the above teaching.

What is claimed is:

1. A multi-level power converter circuit comprising:
- a flying capacitor;
- a balancing capacitor to control a voltage across the flying capacitor;
- a plurality of converter switches;
- a control switch coupled between the flying capacitor and the balancing capacitor; and
- control circuitry to open and close the control switch based on states of at least two converter switches of the plurality of converter switches, wherein:
  - in a first state of the multi-level power converter circuit, the control switch is closed and the plurality of converter switches are controlled such that a first side of the flying capacitor is coupled to an input voltage and a second side of the flying capacitor is coupled to the balancing capacitor, and
  - in a second state of the multi-level power converter circuit, the control switch is closed and the plurality of converter switches are controlled such that the first side of the flying capacitor is coupled to the balancing capacitor and the second side of the flying capacitor is coupled to a reference voltage.

2. The multi-level power converter circuit of claim 1, wherein:
- the plurality of converter switches comprises a first converter switch, a second converter switch, a third converter switch, and a fourth converter switch that are coupled in series in that order;
- in the first state of the multi-level power converter circuit, the first converter switch and the third converter switch are closed and the second converter switch and the fourth converter switch are open; and
- in the second state of the multi-level power converter circuit, the second converter switch and the fourth converter switch are closed and the first converter switch and the third converter switch are open.

3. The multi-level power converter circuit of claim 2, wherein the control circuitry is further to:
- cause the control switch to close when one and only one of the first converter switch and the second converter switch are closed; and
- cause the control switch to open when neither of the first converter switch and the second converter switch are closed or when both of the first converter switch and the second converter switch are closed.

4. The multi-level power converter circuit of claim 2, wherein:
- a first side of the flying capacitor is coupled between the first converter switch and the second converter switch; and
- a second side of the flying capacitor is coupled between the third converter switch and the fourth converter switch.

5. The multi-level power converter circuit of claim 2, wherein the control circuitry is further to:
- cause the first converter switch and the fourth converter switch to be in opposite states; and
- cause the second converter switch and the third converter switch to be in opposite states.

6. The multi-level power converter circuit of claim 2, further comprising an inductor and an output capacitor, wherein the control circuitry is further to cause current to flow from the inductor to the output capacitor.

7. The multi-level power converter circuit of claim 6, wherein the control circuitry is further to:
- control the plurality of converter switches based at least in part on a switching period, the switching period comprising four intervals, wherein:
  - in a first of the four intervals, the first converter switch is closed and the second converter switch is opened, such that the voltage across the flying capacitor increases and the current through the inductor increases,
  - in a second of the four intervals, the first converter switch is opened and the second converter switch is opened, such that the voltage across the flying capacitor is substantially constant and the current through the inductor decreases,
  - in a third of the four intervals, the first converter switch is opened and the second converter switch is closed, such that the voltage across the flying capacitor decreases and the current through the inductor increases, and in a fourth of the four intervals, the first converter switch is opened and the second converter switch is opened, such that the voltage across the flying capacitor is substantially constant and the current through the inductor increases.

8. The multi-level power converter circuit of claim 6, wherein the control circuitry is further to control the plurality of converter switches and the control switch such that the voltage across the flying capacitor is maintained to be within a threshold range.

9. The multi-level power converter circuit of claim 1, wherein the multi-level power converter circuit comprises a three-level buck converter.

10. A method for controlling a multi-level power converter circuit, the multi-level power converter circuit comprising a flying capacitor, a balancing capacitor, a plurality of converter switches, and a control switch coupled between the flying capacitor and the balancing capacitor, the method comprising:

operating, using control circuitry, the plurality of converter switches such that an input power is received at an input voltage and an output power is provided at an output voltage, less than the input voltage;

operating, using the control circuitry, the control switch based on states of the plurality of converter switches, such that the balancing capacitor, by controlling a voltage across the flying capacitor, regulates the output voltage;

in a first state of the multi-level power converter circuit, closing the control switch and controlling the plurality of converter switches such that a first side of the flying capacitor is coupled to the input voltage and a second side of the flying capacitor is coupled to the balancing capacitor; and in a second state of the multi-level power converter circuit, closing the control switch and controlling the plurality of converter switches such that the first side of the flying capacitor is coupled to the balancing capacitor and the second side of the flying capacitor is coupled to a reference voltage.

11. The method of claim 10, wherein the plurality of converter switches comprises a first converter switch, a second converter switch, a third converter switch, and a fourth converter switch that are coupled in series in that order, the method further comprising:

in the first state of the multi-level power converter circuit, closing the first converter switch, closing the third converter switch, opening the second converter switch, and opening the fourth converter switch; and in the second state of the multi-level power converter circuit, closing the second converter switch, closing the fourth converter switch, opening the first converter switch, and opening and the third converter switch.

12. The method of claim 11, further comprising:

closing the control switch when one and only one of the first converter switch and the second converter switch are closed; and opening the control switch when neither of the first converter switch and the second converter switch are closed or when both of the first converter switch and the second converter switch are closed.

13. The method of claim 11, further comprising:

controlling the first converter switch such that a first side of the flying capacitor is coupled to or decoupled from the input voltage; and controlling the fourth converter switch such that a second side of the flying capacitor is coupled to or decoupled from the reference voltage.

14. The method of claim 11, further comprising:

causing the first converter switch and the fourth converter switch to be in opposite states; and causing the second converter switch and the third converter switch to be in opposite states.

15. The method claim 10, wherein the multi-level power converter circuit further comprises an inductor and an output capacitor, the method further comprising operating the plurality of converter switches such that the output power flows from the inductor to the output capacitor.

16. The method of claim 15, wherein the plurality of converter switches comprises a first converter switch, a second converter switch, a third converter switch, and a fourth converter switch that are coupled in series in that order, the method further comprising:

operating the plurality of converter switches based at least in part on a switching period, the switching period comprising four intervals;

in a first of the four intervals, closing the first converter switch and opening the second converter switch, such that the voltage across the flying capacitor increases and a current through the inductor increases, in a second of the four intervals, opening the first converter switch and opening the second converter switch, such that the voltage across the flying capacitor is substantially constant and the current through the inductor decreases, in a third of the four intervals, opening the first converter switch and closing the second converter switch, such that the voltage across the flying capacitor decreases and the current through the inductor increases, and in a fourth of the four intervals, opening the first converter switch and opening the second converter switch, such that the voltage across the flying capacitor is substantially constant and the current through the inductor increases.

17. The method of claim 10, further comprising operating the plurality of converter switches and the control switch such that the voltage across the flying capacitor is maintained to be within a threshold range.

18. A method of controlling a three-level buck converter circuit, the three-level buck converter circuit comprising a first converter switch, a second converter switch, a third converter switch, and a fourth converter switch that are coupled in series in that order, a flying capacitor with a first side coupled between the first converter switch and the second converter switch and a second side coupled between the third converter switch and the fourth converter switch, and a balancing capacitor coupled between the second converter switch and the third converter switch using a control switch, the method comprising:

controlling, using control circuitry of the three-level buck converter circuit, the control switch such that the balancing capacitor, by controlling a voltage across the flying capacitor, regulates an output voltage of the three-level buck converter circuit;

in a first state of the multi-level power converter circuit, closing the control switch and controlling the first converter switch, the second converter switch, the third converter switch, and the fourth converter switch such that a first side of the flying capacitor is coupled to an input voltage and a second side of the flying capacitor is coupled to the balancing capacitor; and in a second state of the multi-level power converter circuit, closing the control switch and controlling the first converter switch, the second converter switch, the third converter switch, and the fourth converter switch such that the first side of the flying capacitor is coupled to the balancing capacitor and the second side of the flying capacitor is coupled to a reference voltage.

19. The method of claim 18, wherein:

in the first state of the multi-level power converter circuit, controlling the first converter switch, the second converter switch, the third converter switch, and the fourth converter switch comprises closing the first converter switch, closing the third converter switch, opening the second converter switch, and opening the fourth converter switch; and in the second state of the multi-level power converter circuit, controlling the first converter switch, the second converter switch, the third converter switch, and the fourth converter switch comprises closing the second converter switch, closing the fourth converter switch, opening the first converter switch, and opening the third converter switch.

20. The method of claim 19, further comprising:

opening the control switch when neither of the first converter switch and the second converter switch are closed or when both of the first converter switch and the second converter switch are closed.

21. The method claim 18, wherein the multi-level power converter circuit further comprises an inductor and an output capacitor, the method further comprising controlling the first converter switch, the second converter switch, the third converter switch, and the fourth converter switch such that an output power comprising the output voltage flows from the inductor to the output capacitor.

22. The method of claim 21, further comprising:

controlling the first converter switch, the second converter switch, the third converter switch, and the fourth converter switch based at least in part on a switching period, the switching period comprising four intervals, wherein:

in a first of the four intervals, closing the first converter switch and opening the second converter switch, such that the voltage across the flying capacitor increases and a current through the inductor increases, in a second of the four intervals, opening the first converter switch and opening the second converter switch, such that the voltage across the flying capacitor is substantially constant and the current through the inductor decreases, in a third of the four intervals, opening the first converter switch and closing the second converter switch, such that the voltage across the flying capacitor decreases and the current through the inductor increases, and in a fourth of the four intervals, opening the first converter switch and opening the second converter switch, such that the voltage across the flying capacitor is substantially constant and the current through the inductor increases.

23. The method of claim 18, further comprising controlling the control switch, the first converter switch, the second converter switch, the third converter switch, and the fourth converter switch such that the voltage across the flying capacitor is maintained to be within a threshold range.

* * * * *